(No Model.)

2 Sheets—Sheet 2.

R. THAMM.
Water Power.

No. 235,314. Patented Dec. 7, 1880.

WITNESSES:
Chas. Nida
C. Sedgwick

INVENTOR:
R. Thamm
BY Munn & Co.
ATTORNEYS.

N. PETERS, PHOTO-LITHOGRAPHER, WASHINGTON, D. C.

UNITED STATES PATENT OFFICE.

ROBERT THAMM, OF OSHKOSH, WISCONSIN.

WATER-POWER.

SPECIFICATION forming part of Letters Patent No. 235,314, dated December 7, 1880.

Application filed October 18, 1880. (No model.)

*To all whom it may concern:*

Be it known that I, ROBERT THAMM, of Oshkosh, in the county of Winnebago and State of Wisconsin, have invented a new and Improved Water-Power, of which the following is a specification.

The object of my invention is to provide a new and improved water-power which is so constructed that the water can act upon but a single motor or upon a series of motors arranged at different heights along the water-race, and which can be brought into action at any desired time and in a simple manner.

The invention consists in a water-power provided with an inclined water-race which conducts the water from the main tank to one or more water-wheels, as may be desired, each of these wheels having a separate race to conduct the water to the next lower wheel. The uppermost wheel is provided with gearing or other mechanism that acts upon a crank-shaft connected with the levers of a series of pumps, so that the descending current, by acting upon this first wheel, actuates the pumps and returns a quantity of water into the tank, the water that has acted upon the first wheel passing down the chute and acting upon the next wheels, which may be connected with machinery or otherwise so arranged that their motive power may be utilized.

Figure 1:
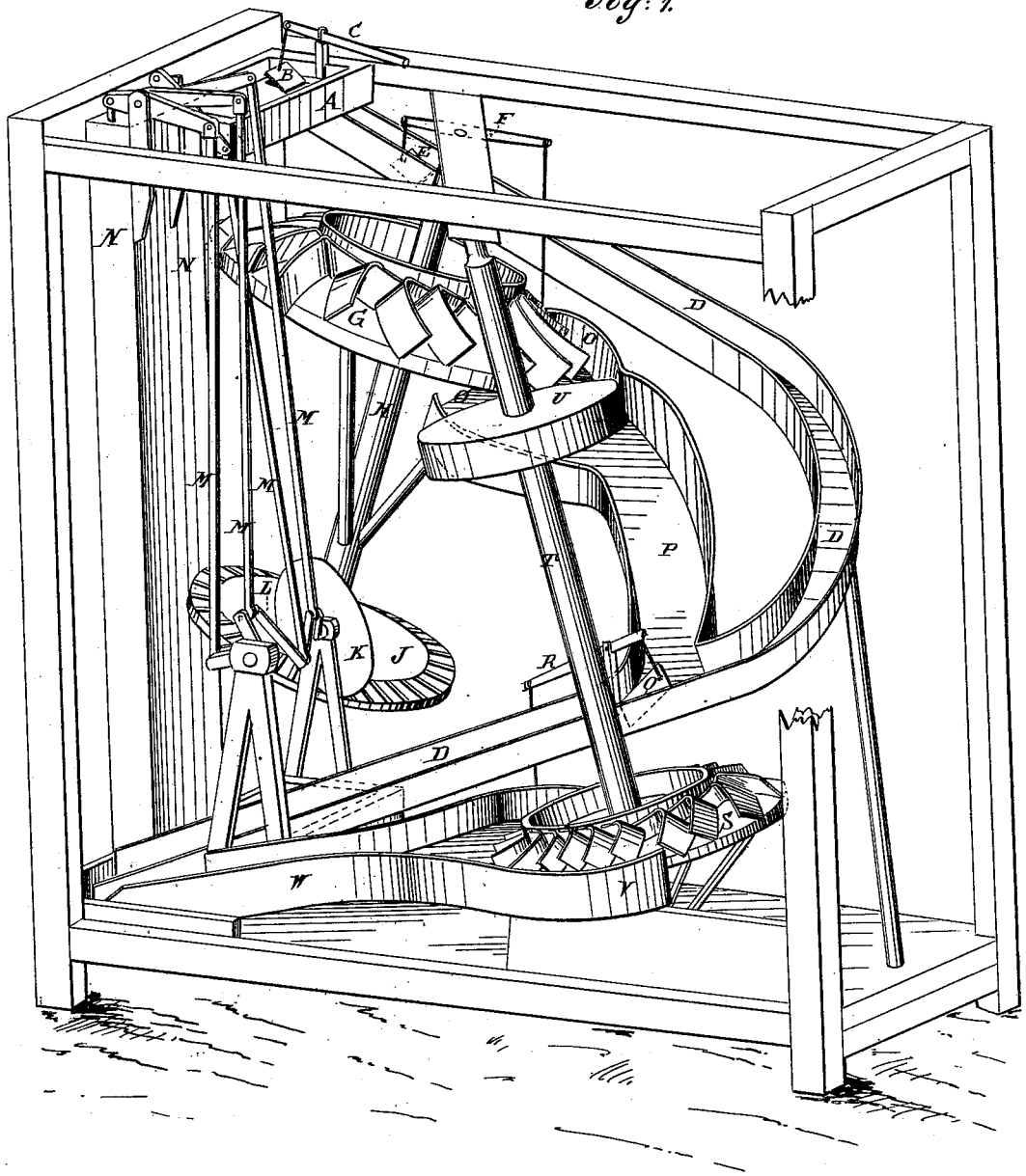
Figure 2:
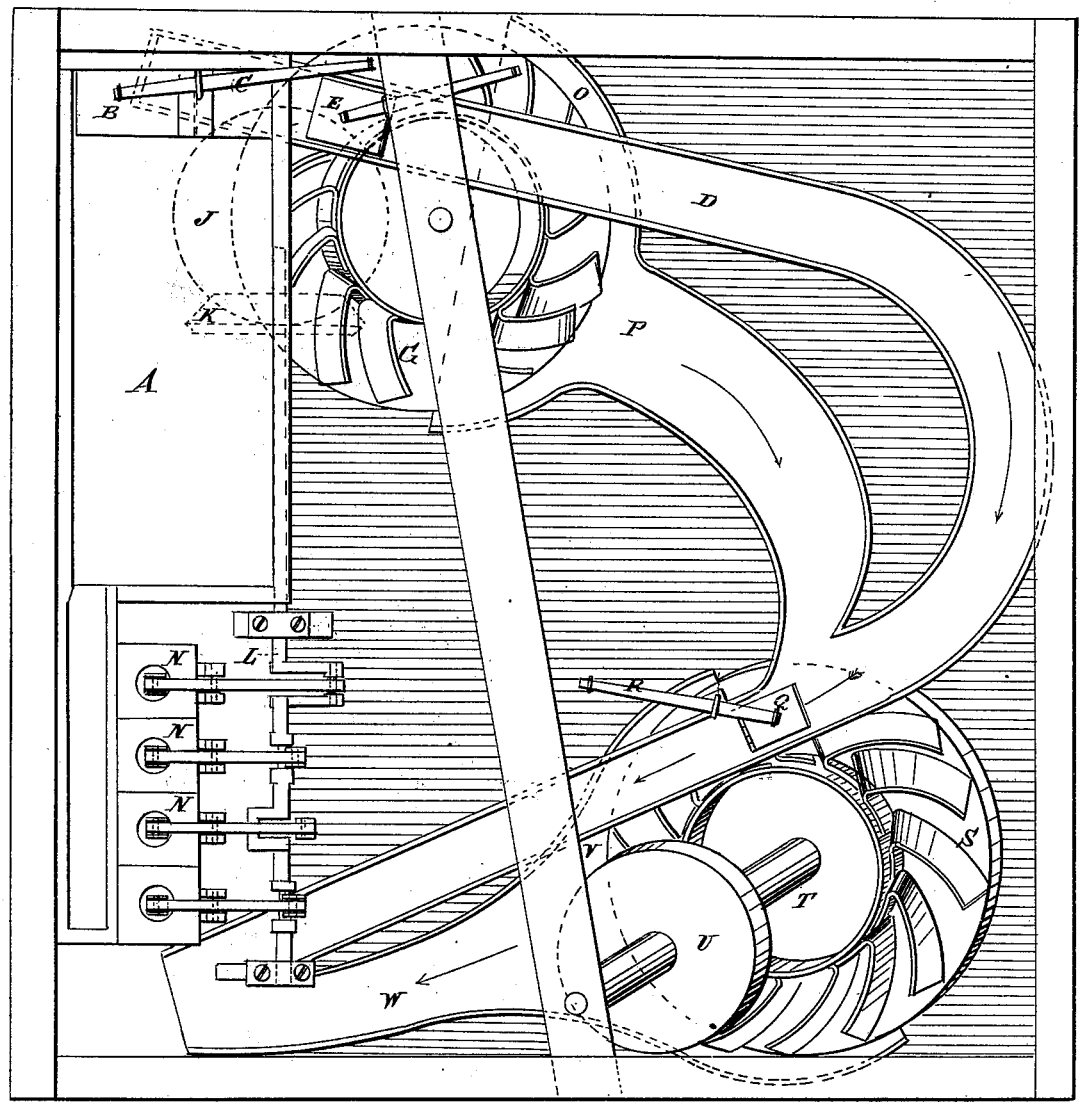
Figure 3:
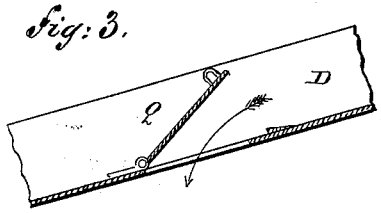

In the accompanying drawings, Figure 1 is a perspective view of my improved water-power. Fig. 2 is a plan view of the same. Fig. 3 is a detail longitudinal elevation of one of the gates of the water-race.

Similar letters of reference indicate corresponding parts.

The water is collected in a tank or reservoir, A, provided with a pivoted gate, B, in the bottom, which gate can be raised by means of a lever, C, one end of which is connected with the gate, whereas the other end is provided with a rope for the operator. From the tank A the water runs into an inclined and curved race, D, provided with a gate, E, pivoted at its lower end and operated by means of a lever, F.

A water-wheel, G, is mounted on a shaft, H, which is slightly inclined, so that the wheel G is also inclined below the gate E. A beveled cog-wheel, J, is mounted on the inclined shaft H and engages with a beveled cog-wheel, K, mounted on a crank-shaft, L, to which the rods M, acting upon the rods of the pumps N N, are pivoted.

A tank or receiver, O, is constructed below the wheel G, and is connected with the main race D by means of a chute or race, P. Beyond the junction of the races D and P the race H is provided with a gate, Q, which is also pivoted at the lower end, and is operated by means of a pivoted lever, R.

A water-wheel, S, is mounted on an inclined shaft, T, below the gate Q, and is provided with a pulley, U, for transmitting the power to machinery.

A tank or receiver, V, is arranged below the wheel S, and the water collected therein is carried off by a chute or race, W. It may be used to drive a third wheel or may be conducted to a tank or reservoir to be pumped up into the main tank A again, partially by the pumps N N and partially by a steam-pump or some other pump driven by animal-power.

The height from the floor of the tank A to the lower water-wheel may be arranged as circumstances may require, but should preferably be not less than fifty to sixty feet.

The gates are all pivoted at the lower end, as shown in Fig. 3, so as to prevent the water from flowing over the opening of the gate.

The operation is as follows: The tank having been filled with a certain quantity of water, the gate B is opened by pulling down the outer end of the lever C. The water rushes down the race D, and if the gate E is not opened it will pass down to the gate Q. If this is opened the water will be suddenly checked by the opened gate and will swell and flow through the opening of the gate upon the wheel S with considerable force. The wheel S is so inclined that it receives the action of the water to the greatest advantage; but if the gate E has been opened the water will flow through the opening of this gate E, will act upon the wheel G, rotating the same, whereby the pumps N N are operated and water is raised into the tank A; but the water that has operated the wheel G rushes down the short race P, and as the gate Q is open it also operates the wheel S. The water thus first acts upon the wheel G to operate the pumps N, and then acts upon the wheel T, which is arranged to act upon machinery either by means of a belt passing over the pulley U or by means of suitable gearing.

In place of the pumps N N any other kind of pump can be arranged to be acted upon by the shaft H of the wheel G, and if desired the pumps may be dispensed with and both wheels G and S may be used to obtain motive power.

The size of the races or chutes is to be varied according to the quantity of water at hand and according to the power desired. The gates are to be of the entire width of the chute, so that no water can escape by the sides of the same.

The special advantage of the within-described water-power is that still water can be utilized as well as a running stream.

Having thus described my invention, I claim as new and desire to secure by Letters Patent—

1. A water-power made substantially as herein shown and described, and consisting of a water-race provided with gates at various heights, and with additional races below each of the several water-wheels arranged below the main race, thereby permitting the water to act on the uppermost wheel first and then upon the next lower wheels, as set forth.

2. In a water-power, the combination, with the inclined water-race D, of the gates E and Q, the water-wheels G and S, and the additional races P and W, leading into the main race D, substantially as herein shown and described, and for the purpose set forth.

3. In a water-power, the combination, with the water-race D, of the gates E and Q, the water-wheels G and S, and the additional races P and W, leading into the main race D, and of the pumps N N, substantially as herein shown and described, and for the purpose of utilizing the water first to work the pumps and raise part of the water again and to drive machinery also, as set forth.

ROBERT THAMM.

Witnesses:
 JOHN W. HUME,
 W. H. CASEY.